(12) United States Patent
Gretz (10) Patent No.: US 6,616,194 B1
(45) Date of Patent: Sep. 9, 2003

(54) LIQUID TIGHT CONNECTOR

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/017,537

(22) Filed: Oct. 22, 2001

(51) Int. Cl.[7] ................................................. F16L 3/04
(52) U.S. Cl. ..................... 285/151.1; 285/319; 285/249; 285/139.2; 285/207; 285/154.1; 174/65 R
(58) Field of Search ............................... 285/319, 151.1, 285/149.1, 154.1, 154.2, 139.2, 207, 249; 174/65 R, 65 G (56) References Cited

U.S. PATENT DOCUMENTS

| | | | |
|---|---|---|---|
| 2,295,830 A | | 9/1942 | Carlson |
| 2,821,567 A | * | 1/1958 | Bergan ..................... 174/78 |
| 3,659,880 A | * | 5/1972 | Goldsobel ................ 285/149.1 |
| 3,966,238 A | | 6/1976 | Washkewicz et al. |
| 4,133,312 A | | 1/1979 | Burd |
| 4,169,967 A | * | 10/1979 | Bachle .................... 174/65 SS |
| 4,224,464 A | * | 9/1980 | Bunnell et al. ........... 174/65 R |
| 4,225,162 A | * | 9/1980 | Dola ........................ 285/139.1 |
| 4,457,544 A | | 7/1984 | Snow et al. |
| 4,842,548 A | * | 6/1989 | Bolante ..................... 439/461 |
| 4,850,620 A | | 7/1989 | Puls |
| 4,900,068 A | | 2/1990 | Law |
| 5,068,496 A | * | 11/1991 | Favalora .................. 174/65 R |
| 5,072,072 A | * | 12/1991 | Bawa et al. ............. 174/65 SS |
| 5,204,499 A | * | 4/1993 | Favalora .................. 174/65 R |
| 6,044,868 A | | 4/2000 | Gretz et al. |
| 6,080,933 A | * | 6/2000 | Gretz ........................ 174/65 R |
| 6,133,529 A | * | 10/2000 | Gretz ........................ 174/65 R |
| 6,162,995 A | * | 12/2000 | Bachle et al. ................ 174/151 |

* cited by examiner

Primary Examiner—Eric K. Nicholson (57) ABSTRACT

A liquid tight connector for connecting non-metallic or metallic conduit to panels or similar devices. The connector is an effort and time saving device that allows connection of conduit to panels without the need to disassemble a portion of the connector and then reassemble again as in prior art devices. The connector allows an installer to simply push a conduit into one end of the connector and push the opposite end of the connector into an aperture in a panel. Liquid tight seals are created between the conduit and the connector and between the connector and the panel. By proper selection of the material of construction, the connector may be built for use with either metallic or non-metallic conduit.

9 Claims, 5 Drawing Sheets

LIQUID TIGHT CONNECTOR

FIELD OF THE INVENTION

The invention relates to connectors for conduit and specifically to an improved liquid tight connector for joining non-metallic or metallic conduit to junction boxes or panels. Conduit may be secured to the rearward end of the connector without the required tightening of nuts with hand tools as in prior art connectors. A snap-fit feature is provided at the forward end to provide easy snap fitting into a panel. The connector therefore is a laborsaving device that greatly simplifies connection of conduit to panels and the like without the use of hand tools.

BACKGROUND OF THE INVENTION

Many prior art liquid tight connectors are commonly in use for connecting non-metallic or metallic conduit to panels or electrical boxes. These connectors are usually multi-piece devices that must be dismantled to fit the conduit into the fitting and then reassembled to secure the conduit. Most of these prior art fittings require the use of a hand tool to tighten a nut sufficiently to achieve a liquid tight connection between the conduit and the connector. Most prior art liquid tight connectors also require the tightening of a nut on the forward end of the fitting to achieve a liquid tight connection between the fitting and the panel or junction box.

For example, U.S. Pat. No. 4,900,068 to Law, granted Feb. 13, 1990 (hereinafter the '068 patent) claims a liquid tight connector that accepts a non-metallic conduit that is grasped by fingers on a clip grasping on an annular ring on a ferrule. To fit the conduit into the liquid tight connector of the '068 patent, an installer usually must remove a compression nut on the rearward end of the connector, insert the conduit into the fitting, and then tighten the compression nut with a hand tool such as a wrench to achieve a liquid tight fit. The forward end of the fitting is threaded and must be inserted into the knock-out of a panel or box, a nut is screwed onto the threaded end, and then a hand tool is typically used to secure the fitting to the panel or box. A hand tool therefore is typically employed to achieve a secure liquid tight fit on both the rearward end of the fitting, between the conduit and the fitting, and on the forward end of the fitting, between the fitting and the panel or box.

U.S. Pat. No. 5,072,072 granted to Bawa, et al., on Dec. 10, 1991 (hereinafter the '072 patent) attempts to improve upon the fitting provided in the '068 patent by providing a fitting that requires minimal torque on a gland nut to secure the conduit to the rearward end of the fitting. Upon tightening of the gland nut on the connector body claimed by the '072 patent, the gland nut engages resilient fingers with minimal friction loss, thereby enhancing hand tightening or minimizing the torque required with a tightening tool. The '072 patent therefore requires the separate operation of tightening a nut either by hand or with a tightening tool. The forward end of the fitting in the '072 patent is typically threaded and requires the use of a nut to secure the fitting to the panel and also an O-ring between a forward shoulder and the panel to achieve a liquid tight fit.

Therefore, as described above, the disadvantages of existing art liquid tight connectors for connecting conduit to panels include:

(a) The connector includes from two to five separate pieces, some of which must be disassembled at the jobsite prior to insertion of the conduit and then reassembled after the conduit is inserted into the rearward end.

(b) Prior art liquid tight connectors for conduit typically includes a compression, gland, or other nut that must be tightened by hand or by a tightening tool to achieve a liquid tight connection on the rearward end between the conduit and the connector.

(c) The forward end of prior art liquid tight connectors for conduit typically require the use of a nut that must be tightened with a hand tool to achieve a liquid tight fit between the connector and the panel.

(d) A separate washer or O-ring is typically provided with prior art liquid tight conduit connectors and must be assembled onto the forward end of the connector prior to insertion of the forward end into the knock-out on a panel or box.

SUMMARY OF THE INVENTION

The invention is an assembly of parts that is provided as a one-piece connector for achieving a liquid tight seal between a non-metallic or metallic conduit and an electrical panel or box. The connector includes a tubular member with an axial bore there through and a centrally located flange dividing it into two ends including a forward end having threads on its exterior surface and a rearward end having an extending ferrule. The forward end accommodates a spring steel adapter and a washer. The rearward end accommodates a tubular retainer body and a tubular retainer body cover. The connector is an assembly of the separate pieces, none of which need to be disassembled when placed in use. The retainer body is held around the ferrule or rearward end by the retainer body cover that is screwed onto a threaded shoulder extending from the central flange. The washer is held on the forward end of the connector by outward projecting tangs in the spring steel adapter, which in turn is either snap-fitted or screwed onto the forward end. The connector assembly has the advantages of providing a one-piece connector assembly which may be simply installed by pushing a conduit into a channel on the rearward end of the connector and then pushing the forward end of the connector into a knock-out in a panel or junction box until the outward projecting tangs on the steel adapter snap into place to engage the wall of the panel or box. The connector therefore is a significant labor saving device over prior art liquid tight conduit connectors as disassembly of parts is not required and hand or tool tightening of nuts is not required on either the forward or rearward end.

| Part No. | Part Description |
| --- | --- |
| 20 | liquid tight connector |
| 22 | snap tight ring |
| 24 | washer |
| 26 | ferrule bushing |
| 28 | retainer body |
| 30 | retainer body cover |
| 32 | flange |
| 34 | forward end (of ferrule bushing) |
| 36 | rearward end (of ferrule bushing) |
| 38 | ferrule |
| 40 | rearward wall (of flange) |
| 42 | collar |
| 44 | threads (on collar) |
| 46 | end (of ferrule) |
| 48 | base (of ferrule) |
| 50 | nose |
| 52 | threaded shoulder (of nose) |
| 54 | hex surface (of flange) |
| 56 | seat |
| 58 | forward wall (of flange) |
| 60 | central bore (through ferrule bushing) |
| 62 | inner end (of retainer body cover) |
| 64 | outer end (of retainer body cover) |
| 66 | inner end (of retainer body) |
| 68 | outer end (of retainer body) |
| 70 | U-shaped cuts |
| 72 | inward directed tangs (of retainer body) |
| 74 | necked-down portion (of retainer body) |
| 76 | central bore (through retainer body) |
| 78 | wall (of retainer body) |
| 80 | outward tangs (on snap tight ring) |
| 82 | tapered outer periphery (of washer) |
| 84 | rearward wall (of collar) |
| 86 | interior threads (of retainer body cover) |
| 88 | free end (of inward directed tang) |
| 90 | conduit accepting channel |
| 92 | lip (on retainer body cover) |
| 94 | conduit |
| 96 | junction box |
| 98 | knockout aperture |
| 100 | forward end (of connector) |
| 102 | rearward end (of connector) |
| 104 | end (of conduit) |
| 106 | wall (of junction box) |

DESCRIPTION OF THE INVENTION

Figure 10:
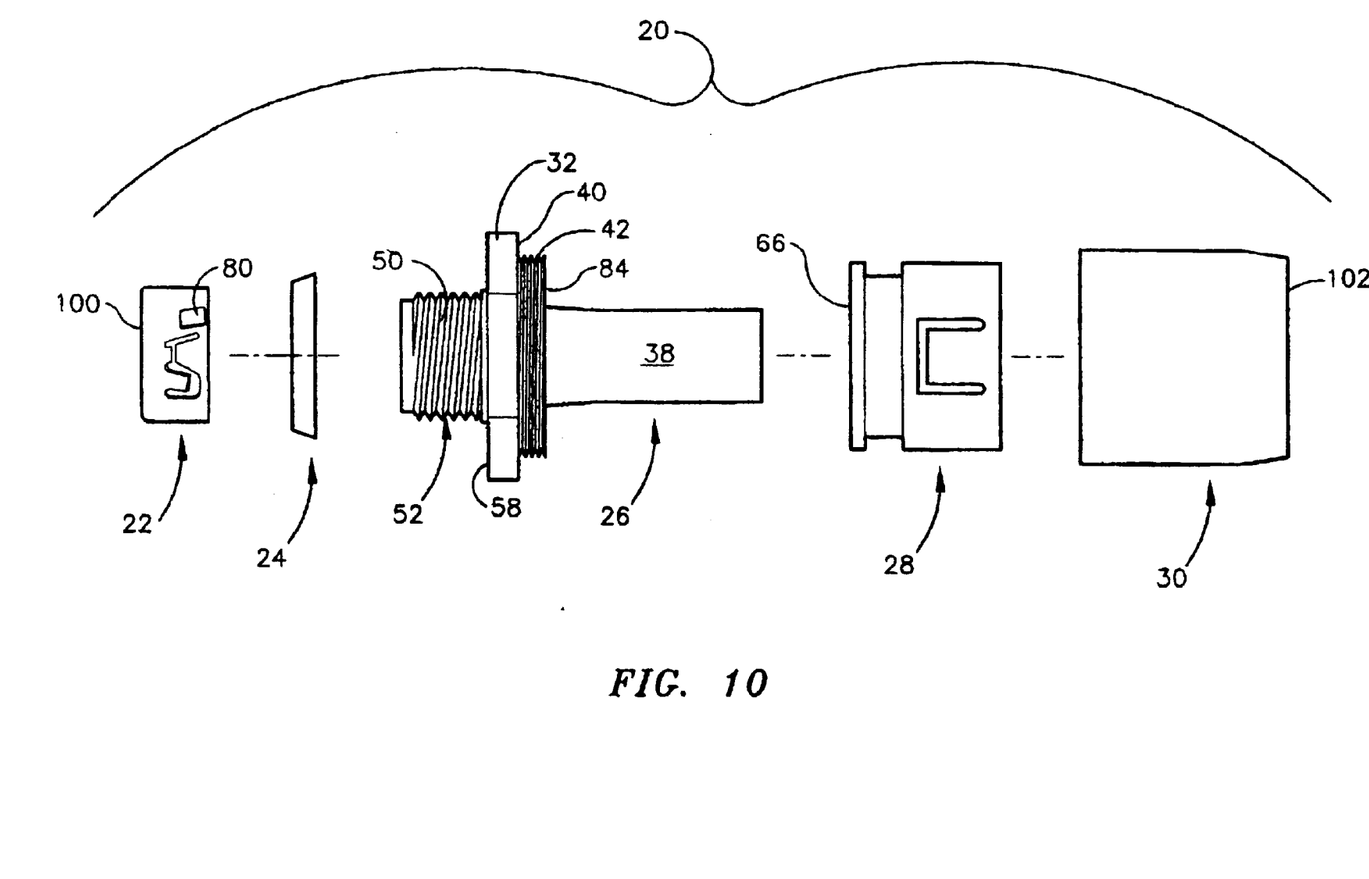
FIG. 10 is a side view showing the five portions of the preferred embodiment as they will be aligned prior to assemblage to form the liquid tight connector of the present invention and including, from left to right, the snap tight ring, the Santoprene washer, the ferrule bushing, the retainer body and the retainer body cover.

According to the present invention, five separate pieces are assembled as shown in FIG. 10 to form the preferred embodiment of the liquid tight connector 20. The five pieces, including from left to right, the snap tight ring 22, the washer 24, the ferrule bushing 26, the retainer body 28, and the retainer body cover 30 are shown as they will be aligned prior to assemblage.

Figure 1:
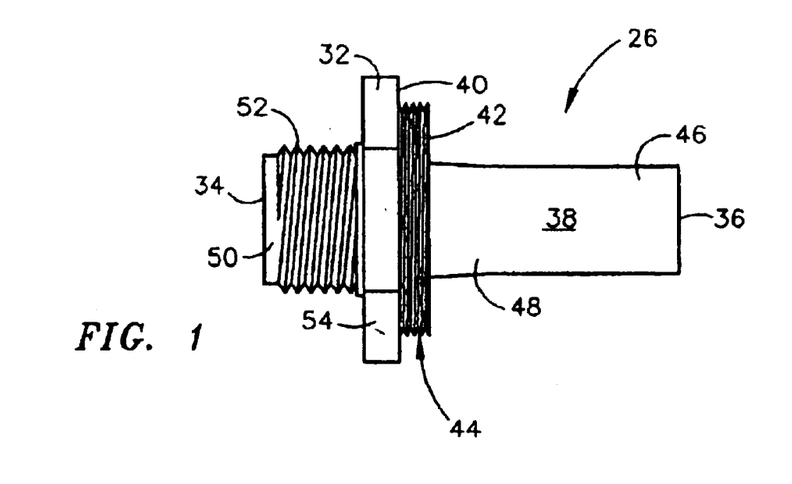
FIG. 1 is a plan view of the ferrule bushing portion of the liquid tight connector of the present invention.

Referring to FIG. 1, a plan view of the ferrule bushing 26 shows a flange 32 dividing the bushing 26 into a forward end 34 and a rearward end 36. The ends of the ferrule bushing 26 are labeled according to the direction they will eventually face when used in conjunction with a box or panel, with the forward end 34 being the end facing the panel and the rearward end 36 away from the panel. The rearward end 36 consists of a ferrule 38 extending from the rearward wall 40 of the flange. Also extending from the rearward wall 40 of the flange 32 is a collar 42 concentric with the ferrule 38. The outer surface of the collar contains threads 44. The ferrule 38 is narrow at its end 46 and tapers outward to a wider diameter near its base 48 toward the junction with the flange 32. The forward end 34 of the ferrule bushing 26 includes a tubular nose 50 including a threaded exterior surface 52. The exterior periphery of the flange has a hex surface 54.

Figure 2:
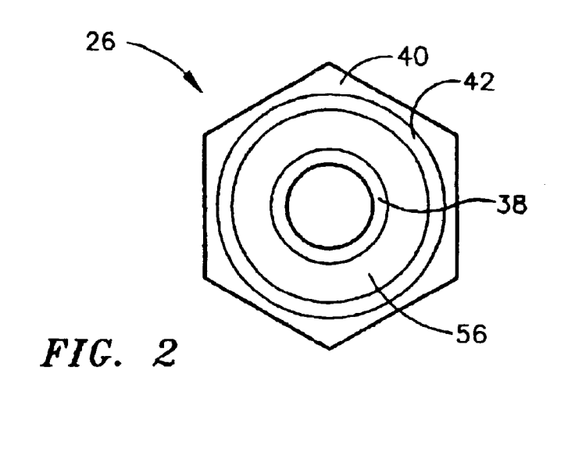
FIG. 2 is an end view of the ferrule bushing as viewed from the right side of FIG. 1.

Referring now to FIG. 2, an end view of the ferrule bushing 26 is depicted as viewed from the right side of FIG. 1. The tubular ferrule 38 is shown extending from the rearward wall 40 of the flange 32. Outside of and concentric to the ferrule 38 is the collar 42 also extending from the rearward wall 40 of the flange. The surface of the rearward wall 40 between the ferrule 38 and the collar 42 includes a seat 56.

Figure 3:
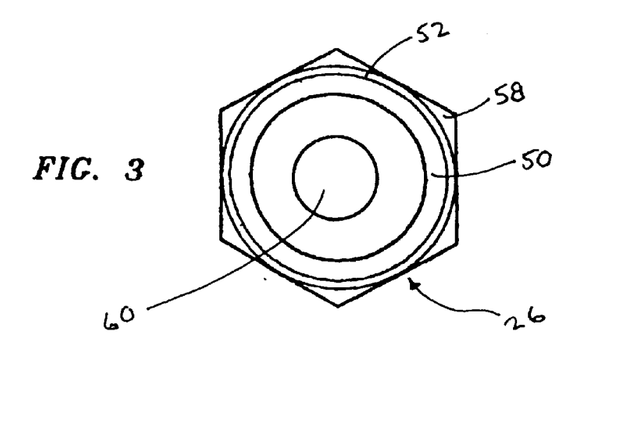
FIG. 3 is an end view of the ferrule bushing as viewed from the left side of FIG. 1.

As shown in FIG. 3, an end view of the ferrule bushing 26 as viewed from the left side of FIG. 1, the nose 50 extends from the forward wall 58 of the flange 32 and includes a threaded exterior surface 52. The central bore 60 extends through the ferrule bushing 26.

Figure 4:
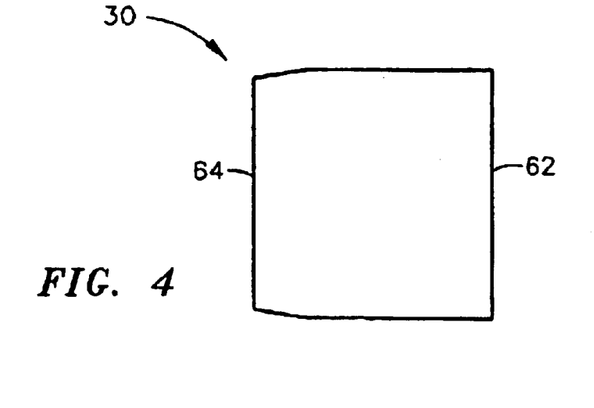
FIG. 4 is a plan view of the retainer body cover portion of the liquid tight connector.

Referring now to FIG. 4, a plan view of the retainer body cover 30 depicts the cover 30 having an inner end 62 that will face the ferrule bushing 26 (not shown in FIG. 4) when the liquid tight connector is assembled and an outer end 64 that will face outward from the connector (not shown in FIG. 4).

Figure 5:
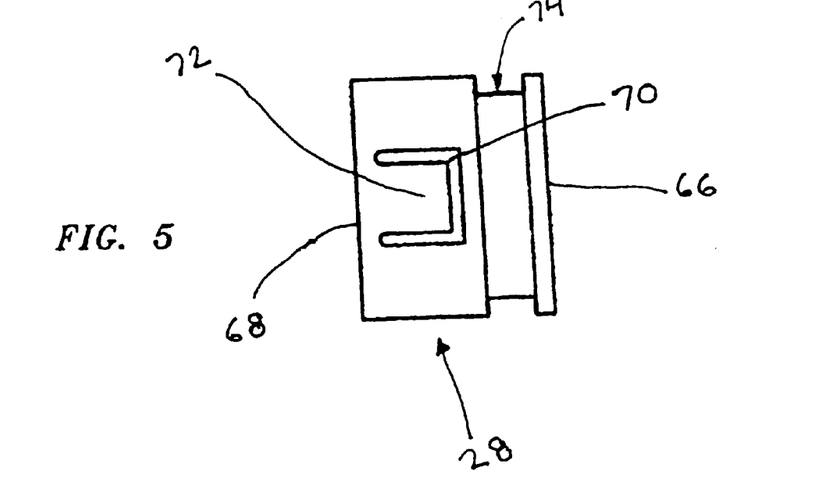
FIG. 5 is a plan view of the retainer body of the liquid tight connector of the present invention.

Referring to FIG. 5, a plan view of the retainer body 28 depicts it having an inner end 66 that will face the ferrule bushing (not shown in FIG. 5) and an outer end 68. U-shaped cuts 70 on the outer periphery of the retainer body 28 define inward directed tangs 72 that extend into the central bore through the tubular retainer body 28. The retainer body 28 includes a necked-down portion 74 near the inner end 66.

Figure 6:
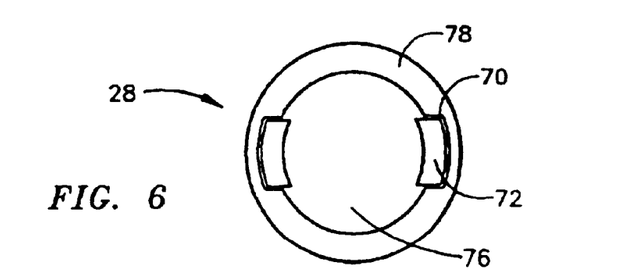
FIG. 6 is an end view of the retainer body as viewed from the left side of FIG. 5.

An end view of the retainer body 28, as viewed from the left side of FIG. 5, is shown in FIG. 6. The inward directed tangs 72 extend into the central bore 76 of the retainer body 28 from U-shaped cuts 70 in the wall 78 of the retainer body.

Figure 7:
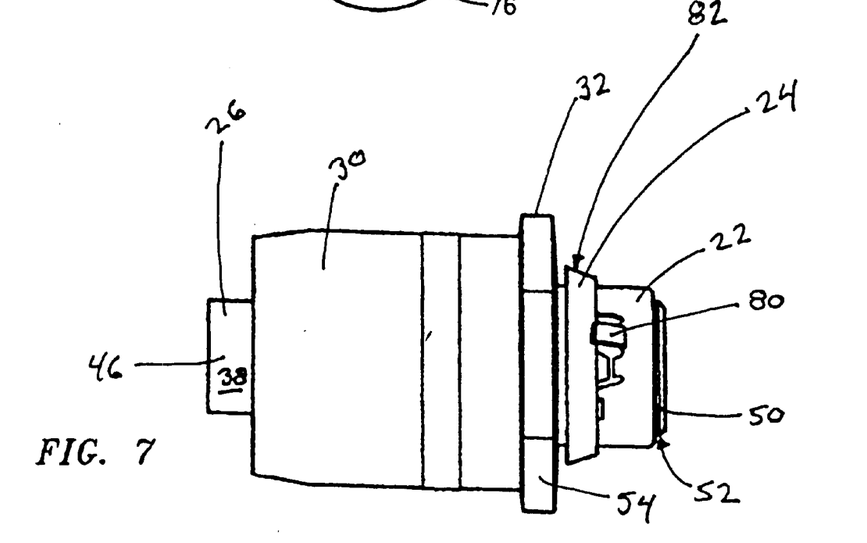
FIG. 7 is a plan view of the preferred embodiment of the present invention, a liquid tight connector consisting of an assemblage of the five separate portions.

Referring to FIG. 7, a plan view is presented of the preferred embodiment of the present invention, a liquid tight connector 20 consisting of an assemblage of the five separate portions including the snap tight ring 22, washer 24, ferrule bushing 26, retainer body cover 30, and retainer body (covered by retainer body cover and therefore not in view in FIG. 7). The end 46 of the ferrule 38 is shown extending from the retainer body cover 30 on the left side of FIG. 7 with the flange 32 and its hex surface 54 toward the right of FIG. 7. Outward tangs 80 on the snap tight ring 22 restrain the washer 24 on the nose 50 of the ferrule bushing 26. The snap tight ring 22 may be held on the nose 50 by inward tangs (not shown in FIG. 7) that mate with the threaded shoulder 52 of the nose 50. Further details of the snap tight ring may be found in U.S. Pat. No. 6,080,933, issued Jun. 27, 2000 in the name of Thomas J. Gretz for "Snap in Cable Connector", and herein incorporated by reference in its entirety, which describes a locking cable connector composed of three mating pieces that snap together and provide a connector for connecting helically wound armored or metal clad electrical conductors to junction boxes or electrical panels. The washer 24 typically has a tapered outer periphery 82, with the wider portion of the taper oriented toward the flange 32, as shown in FIG. 7.

Figure 8:
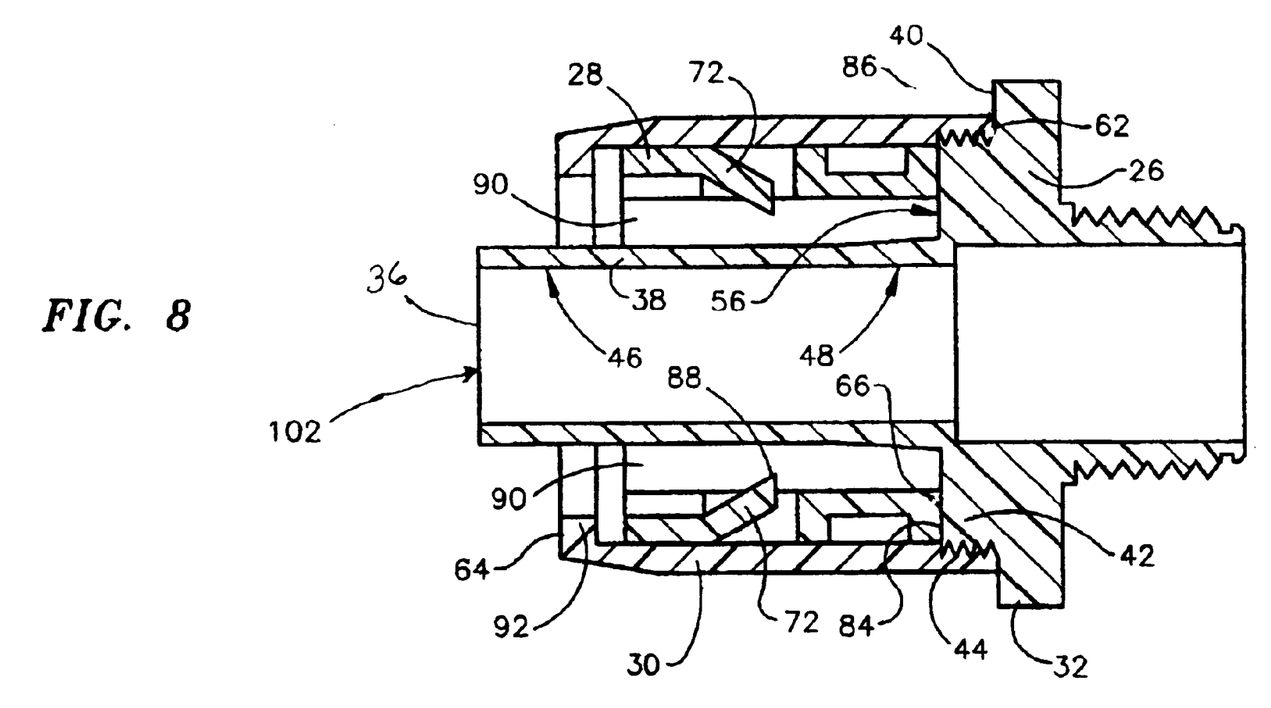
FIG. 8 is a sectional view of the assembled retainer body cover, retainer body, and ferrule bushing of the present invention.

The interaction of three of the various pieces that form the preferred embodiment of the present invention are better understood by referring to the sectional view of the partially assembled liquid tight connector shown in FIG. 8. The retainer body 28 slides over the ferrule 38 of the ferrule bushing 26 and the inner end 66 of the retainer body 28 contacts the rearward wall 84 of the collar 42. The retainer body cover 30, including interior threads 86 on its inner end 62, slides over the retainer body 28 and is screwed onto the threads 44 on the collar 42 of the ferrule bushing 26 until the inner end 62 of the retainer body cover 30 contacts the rearward wall 40 of the flange 32. Once the retainer body cover 30 is tightened on the collar 42 in this manner, the retainer body 28 is held concentrically around the ferrule 38 portion of the ferrule bushing 26 as shown in FIG. 8 and the lip 92 at the outer end 64 of the retainer body cover 30 holds the retainer body 28 within the retainer body cover 30. The inward directed tangs 72 of the retainer body 28 include free ends 88 that are oriented toward the rearward wall 40 of the flange 32. As shown in this cross-sectional view, the end 46 of the ferrule 38 gradually tapers upward in thickness toward the base 48. A conduit-accepting channel 90 is created between the retainer body 28 and the retainer body cover 30. The channel 90 is open at the rearward end 36 of the ferrule bushing 26 and is sized to accept a given trade size of conduit (not shown in FIG. 8). The inner extent of the channel includes a seat 56 defined by a portion of the rearward wall 84 of the collar 42.

Figure 9:
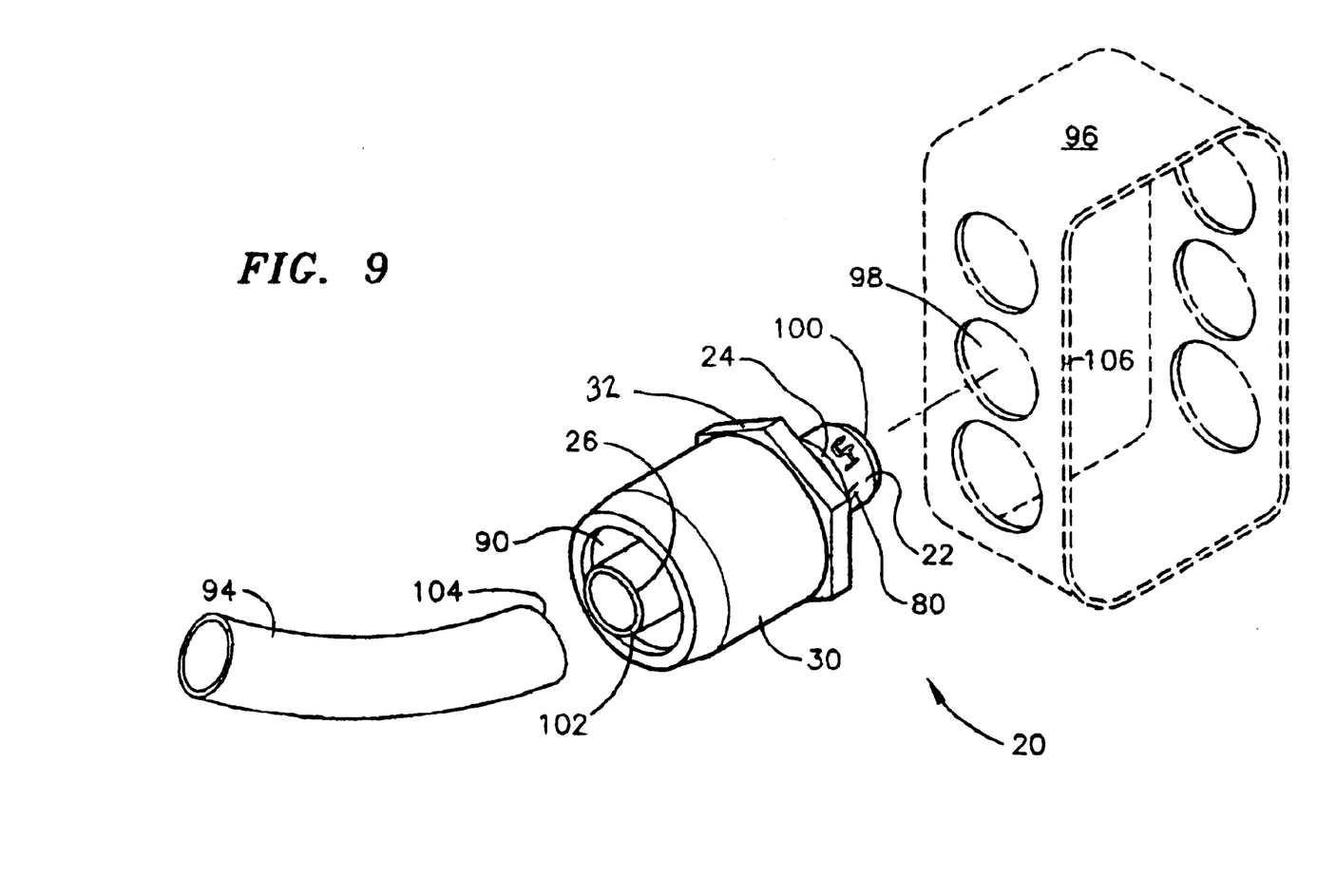
FIG. 9 is a perspective view showing a section of conduit, the assembled retainer body cover, retainer body, and ferrule bushing, the Santoprene washer, the snap-tight ring, and a junction box to which the connector will be fitted.

Referring to FIG. 9, the outer portion of the conduit-accepting channel 90 is visible in this perspective view showing a section of conduit 94, the assembled retainer body cover 30, retainer body (not visible in FIG. 9), and ferrule bushing 26. The washer 24, the snap tight ring 22, and a junction box 96, to which the connector 20 will be fitted at a knockout aperture 98, are also shown.

Referring to FIG. 10, the rearward end 102 of the connector 20 would be assembled by sliding the inner end 66 of the retainer body 28 over the ferrule 38 until it contacts the rearward wall 84 of the collar 42. The retainer body cover 30 would then be slid over the retainer body 28 until the interior threads (not visible in FIG. 10) of the retainer body cover 30 contacted the exterior threads 44 on the collar 42 and then screwed onto the collar 42 until the inner end 62 of the cover 30 is tightened against the rearward wall 40 of the flange. The forward end 100 of the connector, shown on the left side of FIG. 10, would be assembled by sliding the washer 24 over the nose 50 portion of the ferrule bushing 26 and then threading the snap tight ring 22 onto the threaded surface 52 of the nose 50. Once tightened onto the nose 50, the snap tight ring 22 would be tight against the forward wall 58 of the flange 32 and the outward tangs 80 of the snap tight ring 22 would hold the washer 24 against the forward wall 58.

To put the liquid tight connector 20 of the present invention into service, the connector 20 would be provided with the five separate pieces, as shown in FIG. 10, completely assembled, as shown in FIG. 7 (retainer body obscured by retainer body cover and therefore not visible).

Referring to FIG. 9, once assembled, the liquid tight connector 20 is typically connected to a panel or junction box 96 by simply grasping a conduit 94 of the proper trade size, inserting it into the conduit-accepting channel 90 on the rearward end 102 of the connector, and pushing the conduit 94 into the channel 90 until the end 104 of the conduit is pushed flush against the seat (not visible in FIG. 9) at the end of the channel. After the conduit 94 is secured to the connector 20, the forward end 100 of the connector 20 is pushed into the knockout aperture 98 of a junction box 96 until the outward tangs 80 clear the wall 106 of the junction box 96. The snap tight ring 22 is constructed of a resilient material such as spring steel and the outward tangs 80 are oriented, in their unbiased position, outward from the outer periphery of the ring 22. As the outward tangs 80 enter the knockout aperture 98 they are compressed inwardly. Further advancement of the snap tight ring 22 into the knockout aperture 98 eventually causes the outward tangs 80 to clear the wall 106 of the junction box 96 at which point the outward tangs 80 will snap back to their unbiased position. The outward tangs 80 then hold the connector 20 securely to the junction box 96.

The water tight sealing nature of the connector is best explained by referring to the sectional view shown in FIG. 8. The conduit-accepting channel 90 resides between the retainer body 28 and the retainer body cover 30 and is sized to accept a given trade size of conduit (not shown in FIG. 8). To install the connector, an installer would insert the proper trade size of conduit into the conduit-accepting channel 90 and push it therein. As the conduit advances from the end 46 to the base 48 of the ferrule 38, the conduit envelops the ferrule 38 and forces the inward directed tangs 72 outward. Since the retainer body 28 and its inward directed tangs 72 are formed of a resilient material, the inward directed tangs 72 dig into the surface of the conduit and prevent it from being withdrawn. As the conduit advances farther into the conduit-accepting channel 90, the end of the conduit (not shown in FIG. 8) is pushed onto the base 48 and the conduit is spread radially outward by the wider taper of the base 48. Eventually the conduit is advanced to the end of the channel 90 where the end of the conduit contacts the seat 56. The conduit is prevented from being withdrawn by the inward directed tangs 72 with the free end 88 of each tang digging into the surface of the conduit (not shown in FIG.8). At its full insertion into the conduit-accepting channel 90 the inner circumference of the conduit is held tightly on its inside by the wider taper of the base 48 of the ferrule 38, the end of the conduit is sealed tightly against the seat 56, and the outer periphery of the end of the conduit is sealed by the inner periphery of the retainer body 28. A water tight seal is therefore established between the rearward end 102 of the connector and the conduit.

Referring again to FIG. 9, after the conduit 94 has been inserted fully into the conduit-accepting channel 90 to create a water tight seal on the rearward end 102 of the connector 20, the forward end 100 of the connector may be secured to a junction box or panel. The washer 24 is held against the forward wall 58 of the flange 32 by the outward tangs 80 on the snap tight ring 22. The forward end 100 of the connector 20 is simply pushed into a knockout aperture 98 of a panel or a junction box 96, as depicted in FIG. 9. The snap tight ring 22, being of a lesser diameter than the knockout aperture 98, will easily enter the aperture 98. As the snap tight ring 22 is constructed of a resilient material, the outward tangs 80, extending to-a wider diameter than the knockout aperture 98, are depressed as they enter the aperture 98. Once they have cleared the wall 106 of the junction box 96, the outward tangs 80 snap outwardly to their unbiased position, thereby locking the forward end 100 of the connector 20 against the junction box 96. When the forward end 100 of the connector 20 is inserted into the knockout aperture 98, the washer 24 is compressed, and as it is tapered with a narrower diameter toward the forward end 100 of the connector 20, the forward portion of the washer 24 is forced into the open portion between the knockout aperture 98 and the nose 50, thereby sealing the forward end 100 of the connector 20 and creating a water tight seal. When connected completely, with the conduit 94 inserted fully into the conduit-accepting channel 90 and the outward tangs 80 of the snap tight ring 22 engaged with the wall 106 of the junction box 96, the washer 24 is forced into the knockout aperture 98 and the connector 20 is water tight on both its rearward 102 and forward 100 ends.

Conduit is offered in various trades sizes, such as ¼", ½", ¾", etc. Underwriters' Labs has created standards for these trade sizes including specifications for the outer and inner diameters of the various trade sizes. Therefore, the preferred embodiment of the liquid tight connector of the present disclosure can be constructed for any trade size of conduit by sizing the conduit-accepting channel 90, as shown in FIG. 8, to handle the desired trade size conduit. The liquid tight connector can therefore be constructed for ¼", ½", ¾", or any other trade size conduit. The nose 50, snap tight ring 22, and washer 24 can likewise be constructed of any desired size to enable rapid snap-in connection of the forward end 100 of the connector 20 to any trade size of knockout aperture 98.

Referring again to FIG. 10, the pieces of the connector assembly 20 are, from left to right in FIG. 10, the snap tight ring 22, the washer 24, the ferrule bushing 26, the retainer body 28, and the retainer body cover 30. The snap tight ring 22 is typically constructed of spring steel but may be constructed of any resilient metal or plastic. The washer 24 is typically constructed of Santoprene™, which is a trademark of Advanced Elastomer Systems, L.P., but may be constructed of any similar thermoplastic elastomer. Additionally, it may be preferable to construct the washer 24 of a flame retardant grade of thermoplastic elastomer to meet Underwriters Laboratories flame retardant requirements, such as grades UL 94 V-0 or UL 94 HB. The ferrule bushing is preferably constructed of nylon or PVC for non-metallic conduit. If the connector were constructed for metallic conduit, then the ferrule bushing would typically be constructed or zinc, or a similar metal to enable the connector to establish electrical continuity between the metallic conduit and the panel or junction box. The retainer body 28 and the retainer body cover 30 could be constructed of any appropriate metal or plastic, but preferably would be constructed of nylon or PVC.

Although the description above contains many specific descriptions and proposed sizes, these should not be construed as limiting the scope of the invention but as merely providing illustrations of a preferred embodiment of the liquid tight connector of this disclosure. Typical sizes are provided to illustrate a given embodiment of the present invention and should not be construed as limiting its scope.

Thus the scope of the invention should be determined by the appended claims and their legal equivalents, rather than by the specific examples given.

What is claimed is:

1. A liquid tight connector comprising:
   a tubular body including a central flange having a forward and a rearward wall;
   a ferrule extending from said rearward wall;
   a tubular nose portion extending from said forward wall;
   a washer disposed on said nose portion adjacent said forward wall;
   a ring secured to said nose portion, said ring securing said washer against said forward wall, said ring capable of engaging and securing said nose portion to an aperture in a panel in a manner that said washer is compressed and deformed so that the area between said nose portion and said aperture is filled with said washer thereby creating a liquid-tight seal between said nose portion and said panel;
   a tubular retainer body extending from and secured to said rearward wall, said retainer body concentric with and of a greater diameter than said ferrule, said retainer body including inward directed tangs extending within the inner periphery of said retainer body with the free ends of said tangs oriented toward said rearward wall;
   a conduit-accepting channel defined as the area between said ferrule and said retainer body, said channel capable of accepting a metallic or non-metallic conduit and creating a liquid-tight seal between said channel and said conduit;
   threads on the outer periphery of said tubular nose portion; and
   integral tangs extending inwardly from said ring;
   wherein said ring is secured to said nose portion by said integral tangs of said ring extending within said nose portion.

2. The liquid tight connector of claim 1 wherein said ferrule is tapered such that the portion near said forward wall is thicker than the portion outward from said forward wall.

3. The liquid tight connector of claim 1 wherein said washer tapers from a wider diameter on a first side against said forward wall to a narrower diameter on its opposite side away from said forward wall.

4. The liquid tight connector of claim 1 wherein said ring is constructed of spring steel.

5. The liquid tight connector of claim 1 wherein said tubular body is constructed of nylon or PVC for use with non-metallic conduit.

6. The liquid tight connector of claim 1 wherein said tubular body is constructed of zinc for use with metallic conduit.

7. The liquid tight connector of claim 1 wherein said retainer body is constructed of nylon or PVC.

8. The liquid tight connector of claim 1 wherein said retainer body is secured to said rearward wall by a tubular retainer body cover, said retainer body cover having a wider diameter than said retainer body, said retainer body cover including interior threads on an end facing said rearward wall of said flange, said rearward wall including a collar having exterior threads to mate with said interior threads on said retainer body cover, said retainer body cover secured to said rearward wall by screwing said cover onto said collar, said retainer body cover including a lip at its opposite end from said rearward wall to hold said retainer body against said rearward wall.

9. A liquid tight connector comprising:
   a tubular body including a central flange having a forward and a rearward wall;
   a ferrule extending from said rearward wall;
   a tubular nose portion extending from said forward wall;
   a washer disposed on said nose portion adjacent said forward wall;
   a ring secured to said nose portion, said ring securing said washer against said forward wall, said ring capable of engaging and securing said nose portion to an aperture in a panel in a manner that said washer is compressed and deformed so that the area between said nose portion and said aperture is filled with said washer thereby creating a liquid tight seal between said nose portion and said panel;
   a tubular retainer body extending from and secured to said rearward wall, said retainer body concentric with and of a greater diameter than said ferrule, said retainer body including inward directed tangs extending within the inner periphery of said retainer body with the free ends of said tangs oriented toward said rearward wall;

a conduit-accepting channel defined as the area between said ferrule and said retainer body, said channel capable of accepting a metallic or non-metallic conduit and creating a liquid-tight seal between said channel and said conduit; and threads on the outer periphery of said tubular nose portion; wherein said ring is secured to said nose portion by said threads of said nose portion and said retainer body is secured to said rearward wall by a tubular retainer body cover, said retainer body cover having a wider diameter than said retainer body, said retainer body cover including interior threads on an end facing said rearward wall of said flange, said rearward wall including a collar having exterior threads to mate with said interior threads on said retainer body cover, said retainer body cover secured to said rearward wall by screwing said cover onto said collar, said retainer body cover including a lip at its opposite end from said rearward wall to hold said retainer body against said rearward wall.

* * * * *